United States Patent
Fischer

(12) 
(10) Patent No.: US 8,707,776 B2
(45) Date of Patent: Apr. 29, 2014

(54) TIRE PRESSURE MONITORING DEVICE HAVING POWER SUPPLIED BY MAGNETIC INDUCTION

(75) Inventor: Uwe Fischer, Schwaikheim (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 252 days.

(21) Appl. No.: 12/998,353

(22) PCT Filed: Oct. 28, 2009

(86) PCT No.: PCT/EP2009/007701
§ 371 (c)(1),
(2), (4) Date: Jul. 12, 2011

(87) PCT Pub. No.: WO2010/049134
PCT Pub. Date: May 6, 2010

(65) Prior Publication Data
US 2012/0000277 A1    Jan. 5, 2012

(30) Foreign Application Priority Data
Oct. 31, 2008    (DE) .......................... 10 2008 054 161

(51) Int. Cl.
*B60C 23/02* (2006.01)
*G01M 17/02* (2006.01)

(52) U.S. Cl.
USPC ........................................... 73/146.3; 73/146

(58) Field of Classification Search
None
See application file for complete search history.

(56) References Cited

U.S. PATENT DOCUMENTS

| | | | | |
|---|---|---|---|---|
| 2,057,556 A | * | 10/1936 | Cole | 152/427 |
| 4,072,926 A | * | 2/1978 | Shimahara et al. | 340/448 |
| 4,163,208 A | * | 7/1979 | Merz | 340/447 |
| 5,065,134 A | * | 11/1991 | Schmid et al. | 340/442 |
| 5,134,880 A | * | 8/1992 | Gerhard | 73/146.5 |
| 5,355,714 A | * | 10/1994 | Suzuki et al. | 73/146.5 |
| 5,827,956 A | * | 10/1998 | Beste et al. | 73/146 |

(Continued)

FOREIGN PATENT DOCUMENTS

DE    29 51 139    7/1981
DE    100 01 348    7/2001

(Continued)

OTHER PUBLICATIONS

European Patent Office, International Preliminary Report on Patentability and Written Opinion, May 12, 2011, from International Patent Application No. PCT/EP2009/007701, filed on Oct. 28, 2009.

(Continued)

*Primary Examiner* — Lisa Caputo
*Assistant Examiner* — Jermaine Jenkins
(74) *Attorney, Agent, or Firm* — Kenyon & Kenyon LLP

(57) ABSTRACT

A vehicle having a device for acquiring and transmitting at least one measurement signal that characterizes the state of a vehicle tire, such as tire air pressure and/or tire air temperature, having at least one sensor module that is supplied with electrical energy by an energy supply device and that contains at least one tire air pressure sensor and/or at least one tire air temperature sensor, the energy supply device having at least one generator that rotates with the vehicle tire as well as at least one magnetic field generator, an electrical voltage being produced in the generator by electromagnetic induction. The magnetic field generator is situated on a brake caliper of a disc brake of the vehicle.

17 Claims, 3 Drawing Sheets

(56) References Cited

U.S. PATENT DOCUMENTS

| | | | |
|---|---|---|---|
| 5,878,365 A * | 3/1999 | Onogi et al. | 701/70 |
| 5,987,980 A | 11/1999 | Mangafas et al. | |
| 6,604,042 B2 * | 8/2003 | Maruko et al. | 701/96 |
| 7,032,443 B2 * | 4/2006 | Moser | 73/146.5 |
| 7,145,446 B2 | 12/2006 | Katou | |
| 7,205,885 B2 | 4/2007 | Kulha | |
| 7,882,732 B2 * | 2/2011 | Haralampu et al. | 73/146.5 |
| 2002/0134150 A1 * | 9/2002 | Shih | 73/146.2 |
| 2003/0061873 A1 * | 4/2003 | Lin | 73/146.5 |

FOREIGN PATENT DOCUMENTS

| | | |
|---|---|---|
| DE | 696 18 397 | 8/2002 |
| DE | 103 01 192 | 7/2004 |
| DE | 603 10 671 | 10/2007 |
| DE | 11 2004 001 334 | 3/2008 |
| EP | 636 502 | 2/1995 |
| EP | 642 937 | 3/1995 |
| EP | 757 942 | 1/2002 |
| EP | 1 300 263 | 4/2003 |
| GB | 2 065 896 | 7/1981 |
| KR | 2005 0116845 | 12/2005 |
| WO | 2004/045875 | 6/2004 |

OTHER PUBLICATIONS

European Patent Office, Translation of International Preliminary Report on Patentability and Written Opinion, May 12, 2011, from International Patent Application No. PCT/EP2009/007701, filed on Oct. 28, 2009.

* cited by examiner

TIRE PRESSURE MONITORING DEVICE HAVING POWER SUPPLIED BY MAGNETIC INDUCTION

FIELD OF THE INVENTION

The present invention relates to a vehicle having a device for acquiring and transmitting at least one measurement signal that characterizes the state of a tire of the vehicle, such as tire air pressure and/or tire air temperature, having at least one sensor module that is supplied with electrical energy by an energy supply device and that contains at least one tire air pressure sensor and/or at least one tire air temperature sensor, the energy supply device having at least one generator that rotates together with the vehicle tire as well as at least one magnetic field generator, an electrical voltage being produced in the generator by electromagnetic induction.

BACKGROUND INFORMATION

Devices for acquiring and transmitting at least one measurement signal that characterizes the state of a vehicle tire, such as tire air pressure and/or tire air temperature, are in particular tire pressure monitoring devices (Tire Pressure Monitoring System, TPMS), and are used to monitor tire air pressure in vehicles in order to prevent tire failure due to too-low tire air pressure, thus reducing the number of accidents caused by tire failures.

If a vehicle is operated with too-low tire air pressure, this causes increased flexing at the tire edges, thus increasing the wear of the tire. At high acceleration, a tire weakened in this way can under some circumstances no longer withstand the load, and may burst. In addition to tire damage, slow-acting leaks, due to the diffusion of gas through the tire rubber over time, are a significant cause of low tire pressure.

However, tire filling pressure is not only an important factor in driving safety. Driving comfort, tire lifespan, and fuel consumption are all significantly influenced by the filling pressure. A pressure reduced by 0.6 bar can increase fuel consumption by up to 4%, and can shorten the lifespan of the tire by up to 50%.

The increasing proportion of tires having emergency running capacity also requires the use of tire pressure monitoring systems, because the driver can no longer recognize a tire having significantly low pressure on the basis of driving response. In order to prevent the driver from unknowingly exceeding speed and distance limits that hold in such a case, the emergency-running tires must be used only in combination with tire pressure monitoring systems or pressure-loss warning systems.

A fundamental distinction is made between two types of tire pressure monitoring systems: direct and indirect systems.

In direct systems, a sensor module having a pressure sensor is installed in each tire of the vehicle. This sensor uses a coded radio-frequency transmission path to transmit data from inside the tire, such as air pressure and air temperature, to a control device. In the control device, these data can be evaluated, so that, in addition to pressure loss in individual tires, slow loss of pressure in all the tires (e.g. due to diffusion through the rubber) can also be recognized. If the tire air pressure sinks below a defined threshold, or if the pressure gradient exceeds a determined value, the driver is warned by an optical or acoustic signal. As a rule, the sensor modules are supplied with power by a battery. In comparison to other applications, this results in additional requirements with regard to power consumption, media resistance, and sensitivity to acceleration. Micromechanical absolute pressure sensors can be used as sensor elements.

The data measured in the tire by the pressure and temperature sensor are prepared in the sensor module, are modulated onto an RF carrier signal, and are radiated via an antenna. This signal is detected either via individual antennas at the wheel housings or in a central receiver (e.g. in the control device of existing remote keyless entry systems).

In indirect systems, a pressure loss in the tire is determined not immediately but rather via a derived quantity. For this purpose, a mathematical-statistical evaluation is carried out of the differences in rotational speeds among all the wheels. In vehicles having ABS systems, the wheel rotational speed required for this is determined using sensors that are already present, and is transmitted to the ABS control device. Differences in rotational speed occur when the diameter of the corresponding tire becomes smaller due to pressure loss, so that its rotational speed increases relative to the other three tires. Using difference formation, which can be realized using a low-cost expansion of the ABS software algorithms, larger pressure losses at up to three tires can be recognized.

Disadvantages of the indirect system are its comparatively long detection time periods (10 minutes) and a high detection threshold compared to direct systems. Indirect systems currently on the market are not capable of detecting slow pressure losses due to diffusion in all four tires. Another disadvantage of direct systems relative to indirect systems is their significantly higher cost and their limited lifespan, due to the use of a battery.

A vehicle of the general type indicated is discussed in German patent document DE 103 01 192 A1. Due to the fact that the energy supply device includes at least one generator that rotates together with the vehicle tire and at least one magnetic field generator at the vehicle, and that an electrical voltage is produced in the generator by electromagnetic induction, batteries can be completely done without for energy supply. In addition, such a system has a significantly lower maintenance requirement due to the fact that no battery has to be changed.

In comparison, the object of the present intention is to further develop an energy supply device for a device for acquiring and transmitting at least one measurement signal that characterizes the state of a vehicle tire, such as tire air pressure and/or tire air temperature, in such a way that on the one hand it can be easily installed on the vehicle and on the other hand it has a long lifespan.

According to the exemplary embodiments and/or exemplary methods of the present invention, this object is achieved by the features described herein.

SUMMARY OF THE INVENTION

The exemplary embodiments and/or exemplary methods of the present invention provides that the magnetic field generator is situated on a brake caliper of a disc brake that the vehicle contains.

Therefore, instead of providing a separate mount for the magnetic field generator, for example on a connecting rod of the chassis of the vehicle, the exemplary embodiments and/or exemplary methods of the present invention uses an already-present brake caliper of a disc brake of the vehicle as a mount for the magnetic field generator. In view of the relatively large brake disc diameter currently used, brake calipers of disc brakes in current use have a relatively large distance from the wheel axle, and thus a smaller distance from the vehicle tire, so that the distance between the magnetic field generator and the generator that rotates together with the vehicle tire is advantageously small with regard to the extension of the magnetic field.

The measures described herein enable advantageous developments and improvements of the invention indicated and described herein.

According to a particularly specific embodiment, the magnetic field generator is situated on a radially external circumferential surface of the brake caliper, the generator being situated outside a compressed air chamber formed between the vehicle tire and the wheel rim bearing the tire, and in the region of, or on, a radially inner circumferential surface of a rim base of the wheel rim, in a position that overlaps the magnetic field generator, viewed in the radial direction.

In a particular rotational position of the vehicle wheel, in which this wheel and the magnetic field generator are situated precisely opposite one another, the generator is then detected with particular intensity by the magnetic field of the magnetic field generator. In particular, the radial distance between the magnetic field generator and the generator can then be very small. Because the generator is then situated outside the compressed air chamber and is situated opposite the magnetic field generator so as to be separated therefrom only by a narrow air gap, the wheel rim cannot exert a shielding effect.

A particular development of this specific embodiment provides that the rim base of the wheel rim has a radial through-opening for the mounting of at least the sensor module and/or the generator on the rim base of the wheel rim, the sensor module and/or the generator being borne by a module bearer that is mounted in the through-opening of the rim base of the wheel rim. Here, the generator may be connected via the module bearer to the sensor module situated in the compressed air chamber.

For example, the generator is mounted on the end of the module bearer situated in the region of the through-opening, and the sensor module is mounted on the end of the module bearer that extends into the compressed air chamber, the sensor module and the generator being connected to one another by at least one electrical line that runs inside the module bearer.

Alternatively, the sensor module can be situated in the region of, or on, the radially inner circumferential surface of the rim base of the wheel rim, via the module bearer mounted in the through-opening of the rim base of the wheel rim, and, via the module bearer, can be connected to the compressed air chamber so as to conduct pressure. The module bearer thus has a double function, in that on the one hand it bears at least the sensor module while on the other hand it creates the pressure-conducting connection between the compressed air chamber and the sensor module.

This provides the advantage that the sensor module or the sensors are accessible from outside without removing the tire. In addition, an operating device can be attached to the sensor module, which is then accessible from outside, by which operating device the sensors can for example be calibrated and/or allocated to a vehicle wheel. Not least important is the fact that the signals transmitted wirelessly by the sensor module are not shielded by the wheel rim and/or by a steel belt of the vehicle wheel.

A particularly simple common situation and assembly of the generator and the sensor module results if the module bearer contains a hollow screw held in the through-opening, for example by a threaded connection. In this way, the device according to the present invention can easily be retrofitted merely by creating a threaded through-opening in the wheel rim. In addition, the central bore of such a hollow screw provides a simple possibility for creating a pressure-conducting connection or for housing electrical connecting cables.

Particularly, the sensor module, the module bearer, and the generator may then form a constructive unit mounted releasably in the through-opening in the rim base of the wheel rim, said unit being easily mounted and dismounted. In addition, such a constructive unit can also be produced, mounted, and retrofitted at lower cost than can separate assemblies.

Alternatively, the sensor module can form, together with a valve of the vehicle tire, a constructive unit accommodated in a valve receptacle of the wheel rim. An electrical connection is then to be provided that passes through the through-opening, between the generator situated outside the compressed air chamber of the vehicle tire and the sensor module situated in the compressed air chamber. In this way, the valve of the vehicle tire and the sensor module likewise form an easily mounted or dismounted unit; for this purpose, this constructive unit made up of the valve and the sensor module need merely be mounted in or removed from the valve receptacle of the wheel rim allocated to the vehicle tire.

Because the temperatures in the area of the brake caliper can become relatively high during extended braking, the use of electromagnets, as opposed to permanent magnets, may be in the region of the brake caliper, because some types of permanent magnet tend to lose their magnetic force under the action of heat. Electromagnets are more resistant to this.

If in addition a coil of the electromagnet and/or a power supply line of the electromagnet are used as an antenna for data transmission of the measurement signals characterizing the tire state to a receive device, additional transceive antennas can be done without.

Particularly, the electrical voltage induced in the generator produces an electric current may be conducted to an energy storage device in order to charge it. In this way, the energy in the energy storage device is available even when the vehicle is at a standstill and the wheels of the vehicle are not rotating. Such an energy storage device includes for example an accumulator or a capacitor.

The generator contains for example at least one electric coil. According to a further development, the coil and the energy storage device are integrated in the sensor module.

More precise information is found in the following description of an exemplary embodiment. In the exemplary embodiments, identical and identically functioning assemblies and components are designated by the same reference characters.

In the following, an exemplary embodiment of the present invention is shown in the drawing and is explained in more detail in the following description.

DETAILED DESCRIPTION

Figure 1:
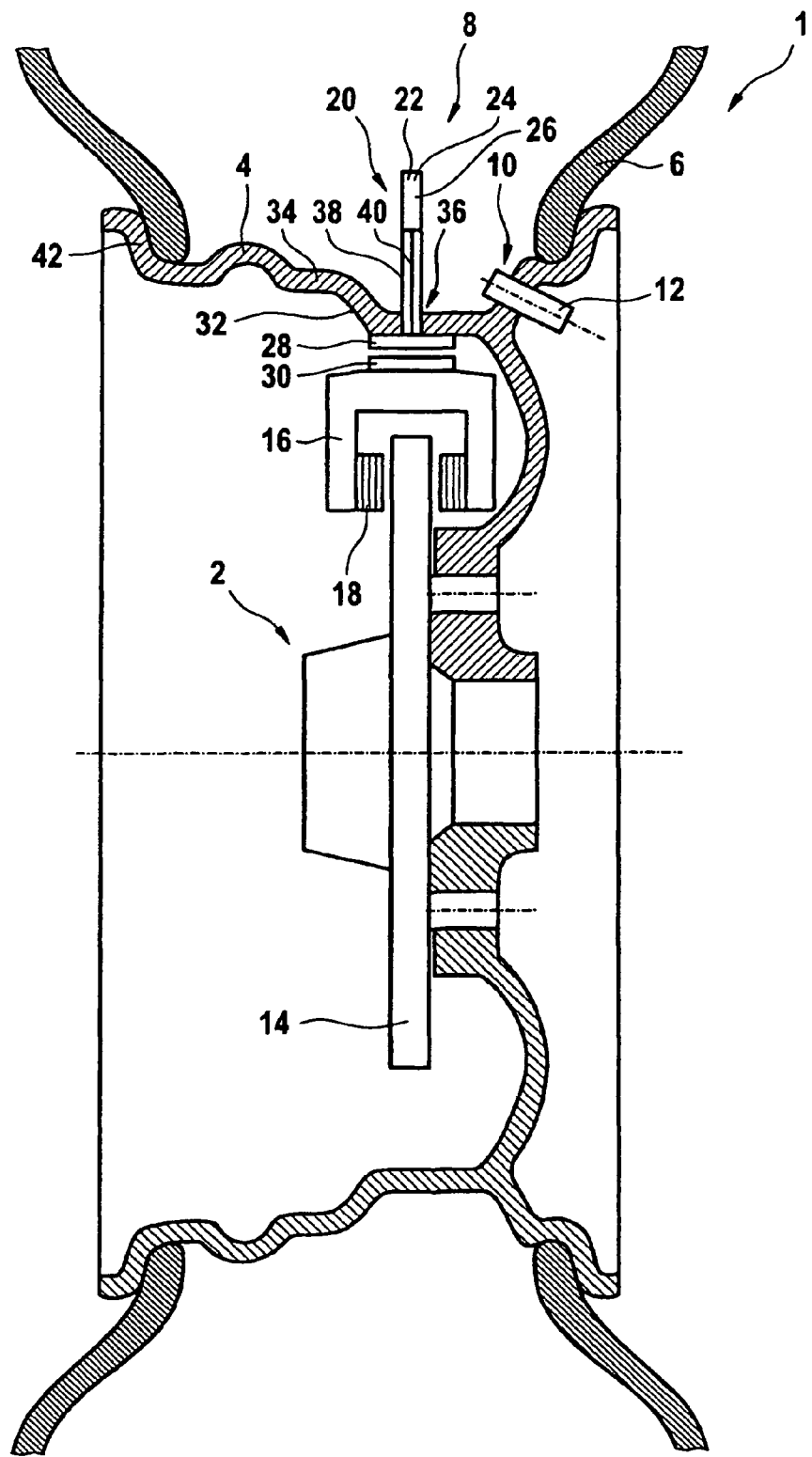
FIG. 1 shows a cross-sectional representation of a vehicle wheel having a device for acquiring and transmitting at least one measurement signal that characterizes the state of a tire of the vehicle, according to a first specific embodiment of the present invention.

FIG. 1 shows a vehicle wheel 1 of a motor vehicle in cross-section, vehicle wheel 1 being braked relative to a chassis (not shown) by a disk brake 2. Vehicle wheel 1 is made up essentially of a wheel rim 4 and a tire 6 fitted thereon, a compressed air chamber 8 being formed between tire 6 and rim 4, said chamber being capable of being filled with air and emptied of air through a tire valve 12 accommodated releasably in a valve receptacle 10 of wheel rim 4.

Wheel rim 4 is connected in rotationally fixed fashion by wheel bolts to a wheel hub (not shown) that is rotatably mounted by a wheel bearing, on which hub a central brake disc 14 of disk brake 2 is fastened axially. Disk brake 2 additionally includes a brake caliper 16 that is connected to an axle body and is therefore fixed relative to the vehicle, and that can be formed as a fixed or floating brake caliper, and that bears brake linings 18 of disk brake 2.

Vehicle wheel 1 is provided with a device 20 for acquiring and transmitting at least one measurement signal that characterizes the state of tire 6, such as tire air pressure and/or tire air temperature in compressed air chamber 8, said device including a sensor module 26 that contains a tire air pressure sensor 22 as well as a tire air temperature sensor 24. Alternatively, sensor module 26 could contain only one tire air pressure sensor 22 or only one tire air temperature sensor 24, and/or additional sensors capable of generating measurement signals that characterize the state of tire 6.

Over a coded RF transmission path, sensor module 26 then transmits the values for the tire air pressure and the tire air temperature from compressed air chamber 8 to a control device in the vehicle. These data are evaluated in the control device, so that, in addition to losses of pressure in individual tires 6, slow pressure losses in all tires (e.g. resulting from diffusion through the rubber) are also recognized. In addition, an excessively high tire air temperature can also be recognized.

Here, sensor module 26 is supplied with electrical energy by an energy supply device that includes a generator 28 that rotates together with tire 6, or with wheel rim 4, as well as a magnetic field generator 30 at the vehicle, generator 28 producing an electrical voltage by electromagnetic induction.

Magnetic field generator 30 may contain at least one electromagnet supplied with electrical energy that produces a magnetic field by which generator 28, which may contain at least one electric coil, is acquired as a function of its rotational position. Alternatively, it is of course also conceivable to use a permanent magnet, or a combination of an electromagnet and a permanent magnet, as a magnetic field generator.

Magnetic field generator 30 is situated on a brake caliper 16 of disk brake 2 of the vehicle, which may be in the radially outer region thereof, so that it has the smallest possible distance from generator 28. Particularly, magnetic field generator 30 may be situated on a radially outer circumferential surface of brake caliper 16, generator 28 being situated in particular outside compressed air chamber 8 formed between tire 6 and wheel rim 4 bearing said tire, and for example being situated on a radially inner circumferential surface 32 of a rim base 34 of wheel rim 4, in a position that overlaps (viewed in the radial direction) magnetic field generator 30 in a particular rotational position (shown in section in FIG. 1).

In the rotational position of vehicle wheel 1 shown in FIG. 1, in which generator 28 and magnetic field generator 30 are situated precisely opposite one another radially and axially, generator 28 is then detected with particular intensity by the magnetic field of magnetic field generator 30. In particular, the radial distance between magnetic field generator 30 and generator 28 is small, a narrow air gap being formed between them.

In addition, rim base 34 of wheel rim 4 may have a radial through-opening 36 via which generator 28 is connected to sensor module 26 situated inside compressed air chamber 8. Here, sensor module 26 is for example borne by a module bearer 38 that is mounted in through-opening 36 and is placed from outside into compressed air chamber 8, or that extends into said chamber.

Module bearer 38 may be formed by a hollow screw that is held in through-opening 36 for example by a threaded connection, generator 28 being mounted at the end of said screw situated in the region of through-opening 36, and sensor module 26 being mounted on the radially inwardly protruding end of said screw, i.e. the end protruding into compressed air chamber 8, for example in that sensor module 26 is accommodated in the interior of hollow screw 38 at the end thereof.

Sensor module 26 and generator or coil 28 are connected to one another by at least one electrical line 40 situated inside hollow screw 38. One end of coil 28 may be connected to wheel rim 4 as a ground connection, and the other end of the coil is connected to sensor module 26 via a single electrical line 40.

Particularly, sensor module 26, module bearer 38, the at least one line 40, and generator 28 may then form a constructive unit that is held releasably, e.g. by a threaded connection, in through-opening 36 in rim base 34. However, the constructive unit made up of sensor module 26, module bearer 38, line 40, and generator 28 could also be mounted on rim 4 or in through-opening 36 by a tightening strap.

According to a further specific embodiment not shown here, generator 28 can also be integrated into sensor module 26; in this case, the segment of sensor module 26 bearing generator 28 is then to be situated outside compressed air chamber 8, for example also in the region of radially inner circumferential surface 32 of rim base 34, in order to avoid shielding of the magnetic field produced by magnetic field generator 30 by rim 4.

Figure 2:
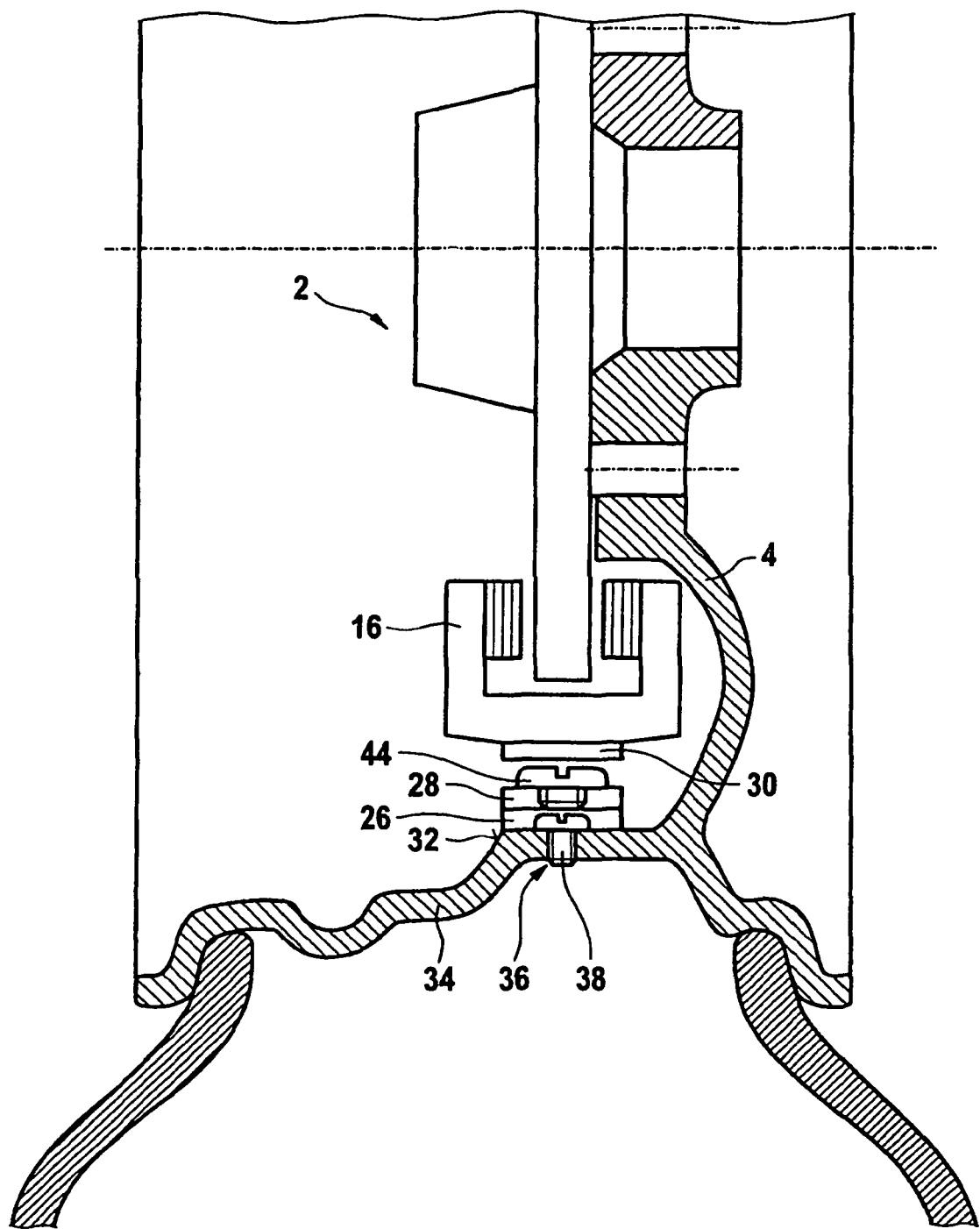
FIG. 2 shows a cross-sectional representation of a vehicle wheel having a device for acquiring and transmitting at least one measurement signal that characterizes the state of a tire of the vehicle, according to a further specific embodiment of the present invention.

Alternatively, sensor module 26 according to the specific embodiment of FIG. 2 can also be situated outside compressed air chamber 8, via module bearer 38 mounted in through-opening 36 of rim base 34 of wheel rim 4, likewise in the region of or on radially inner circumferential surface 32 of rim base 34 of wheel rim 4, and can stand in pressure-conducting connection with the compressed air chamber via module bearer 38.

In this case, module bearer 38 for example also has a hollow screw through whose central through-bore sensor module 26, or more precisely tire air pressure sensor 22 and tire air temperature sensor 24, are connected to compressed air chamber 8 in order to measure the tire air pressure or tire air temperature prevailing there. Here, sensor module 26, coil 28 as generator, and a sealing screw of hollow screw 38 are held by said hollow screw, forming a unit therewith, on radially inner circumferential surface 32 of rim base 34 of wheel rim 4, overlapping magnetic field generator 30, and separated from said generator only by a narrow radial air gap.

Figure 3:
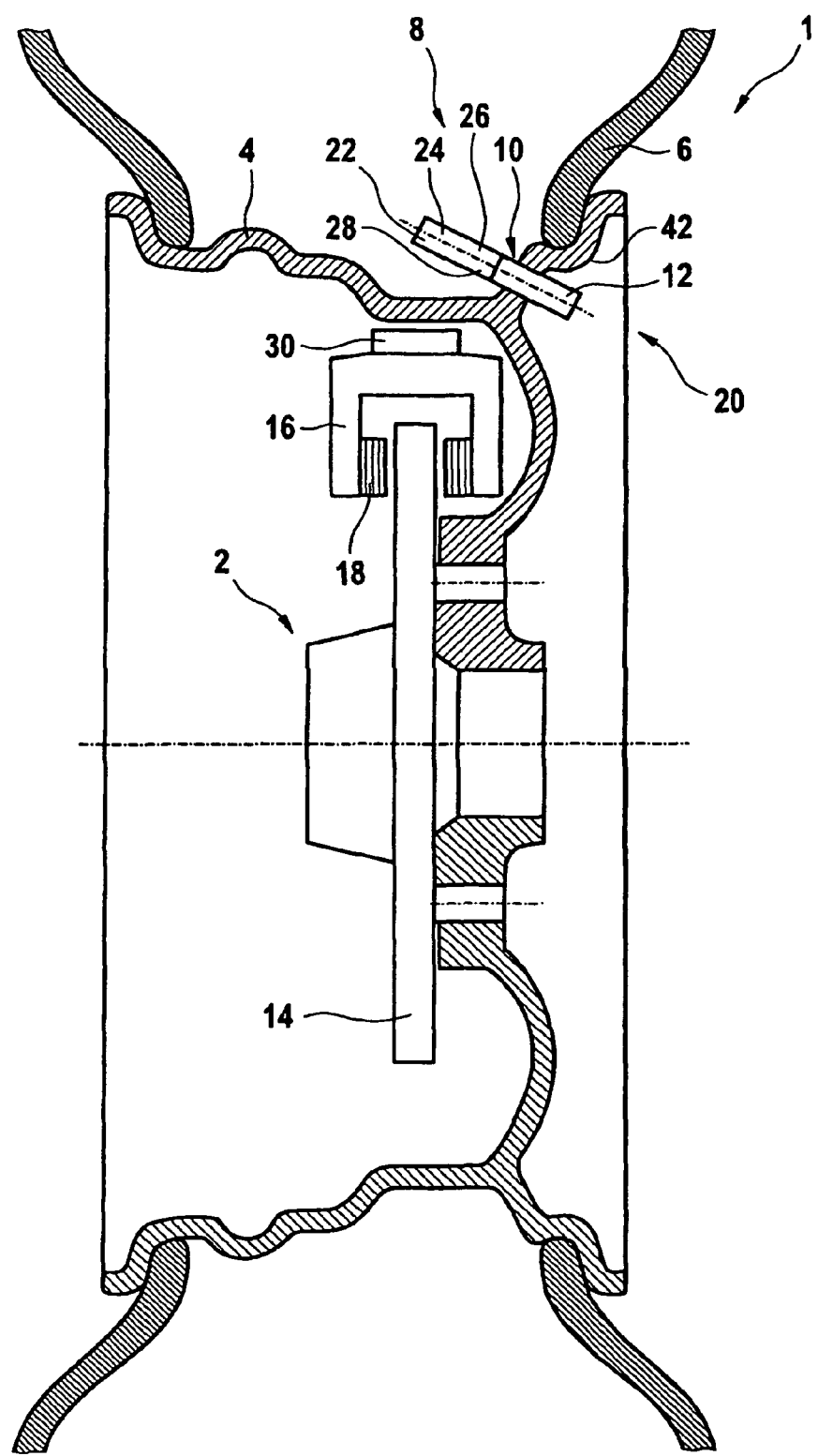
FIG. 3 shows a cross-sectional representation of a vehicle wheel having a device for acquiring and transmitting at least one measurement signal that characterizes the state of a tire of the vehicle, according to a third specific embodiment of the present invention.

Alternatively, according to the specific embodiment of FIG. 3, sensor module 26 can form a constructive unit with tire valve 12, said unit being accommodated and held in valve receptacle 10 in rim shoulder 42 of wheel rim 4. This valve receptacle 10 may be formed by a through-hole in the region of rim shoulder 42 of wheel rim 4. Here, the part of this constructive unit, or of sensor module 26, that bears tire air pressure sensor 22 and tire air temperature sensor 24 protrudes into compressed air chamber 8.

If one or more electromagnets are used as magnetic field generator 30, at least one coil of the electromagnet(s) and/or a power supply line of the electromagnet(s) can be used as an antenna for the data transmission of the measurement signals that characterize the tire state. Likewise, the coil that forms generator 28 and/or the electrical connecting lines thereof could be used, with a double function, as an antenna for data transmission.

If vehicle wheel 1 rotates relative to brake caliper 16, coil 28 also rotates relative to electromagnet 30, inducing an electrical voltage in coil 28 according to the law of induction. This voltage produces an electric current that charges an energy storage device (not shown) that includes for example an accumulator or a capacitor. This energy storage device may in turn be integrated into sensor module 26, and provides the electrical energy required for sensors 22, 24 and for the wireless transmission of the measurement signals.

THE LIST OF REFERENCE CHARACTERS IS AS FOLLOWS 1 vehicle wheel
2 disc brake
4 wheel rim
6 tires
8 compressed air chamber
10 valve receptacle
12 tire valve
14 brake disc
16 brake caliper
18 brake linings
20 device
22 tire pressure sensor
24 tire temperature sensor
26 sensor module
28 generator
30 magnetic field generator
32 radially inner circumferential surface
34 rim base
36 through-opening
38 module bearer
40 electrical lines
42 rim shoulder
44 sealing screw

What is claimed is:

1. A vehicle, comprising:
a device for acquiring and transmitting at least one measurement signal that characterizes the state of a vehicle tire, including at least one of a tire air pressure and a tire air temperature, including:
at least one sensor module that is supplied with electrical energy by an energy supply device, wherein the energy supply device includes a generator that rotates together with a tire of the vehicle;
at least one of: at least one tire air pressure sensor and at least one tire air temperature sensor; and
at least one magnetic field generator, an electrical voltage being produced in the generator by electromagnetic induction, wherein the magnetic field generator is situated on a radially outer circumferential surface of a brake caliper of a disc brake of the vehicle.

2. The vehicle of claim 1, wherein the generator is situated outside a compressed air chamber formed between the vehicle tire and the wheel rim bearing the tire, and is situated in the region of or on a radially inner circumferential surface of a rim base of the wheel rim, in a position that overlaps with the magnetic field generator, viewed in the radial direction.

3. The vehicle of claim 2, wherein the rim base of the wheel rim has a radial through-opening for the mounting of at least one of at least the sensor module and of the generator on the rim base of the wheel rim.

4. The vehicle of claim 3, wherein at least one of the sensor module and the generator is borne in a module bearer mounted in the through-opening of the rim base of the wheel rim.

5. The vehicle of claim 4, wherein the generator is connected, via the module bearer, to the sensor module situated in the compressed air chamber.

6. The vehicle of claim 4, wherein the sensor module is likewise situated, via the module bearer mounted in the through-opening of the rim base of the wheel rim, in the region of or on the radially inner circumferential surface of the rim base of the wheel rim, and is connected to the compressed air chamber in a pressure-conducting fashion via the module bearer.

7. The vehicle of claim 1, wherein the sensor module forms, together with a valve of the vehicle tire, a constructive unit that is accommodated in a valve receptacle of a wheel rim.

8. The vehicle of claim 1, wherein the generator contains at least one electric coil.

9. The vehicle of claim 1, wherein the magnetic field generator contains at least one permanent magnet.

10. The vehicle of claim 1, wherein the magnetic field generator contains at least one electromagnet.

11. The vehicle of claim 10, wherein at least one of a coil of the electromagnet and a power supply line of the electromagnet act as an antenna for the data transmission of the measurement signals that characterize the tire state to a receive device.

12. The vehicle of claim 11, wherein the generator and the energy storage device are integrated in the sensor module.

13. The vehicle of claim 1, wherein the electrical voltage induced in the generator produces an electric current for charging an energy storage device.

14. The vehicle of claim 13, wherein the energy storage device includes at least one accumulator or at least one capacitor.

15. A vehicle, comprising:
a device for acquiring and transmitting at least one measurement signal that characterizes the state of a vehicle tire, including at least one of a tire air pressure and a tire air temperature, including:
at least one sensor module that is supplied with electrical energy by an energy supply device, wherein the energy supply device includes a generator that rotates together with a tire of the vehicle,
at least one of: at least one tire air pressure sensor and at least one tire air temperature sensor, and
at least one magnetic field generator, an electrical voltage being produced in the generator by electromagnetic induction, wherein the magnetic field generator is situated on a brake caliper of a disc brake of the vehicle,
wherein the generator is situated outside a compressed air chamber formed between the vehicle tire and the wheel rim bearing the tire, and is situated in the region of or on a radially inner circumferential surface of a rim base of the wheel rim, in a position that overlaps with the magnetic field generator, viewed in the radial direction,
wherein the rim base of the wheel rim has a radial through-opening for the mounting of at least one of at least the sensor module and of the generator on the rim base of the wheel rim, wherein at least one of the sensor module and the generator is borne in a module bearer mounted in the through-opening of the rim base of the wheel rim, wherein the generator is connected, via the module bearer, to the sensor module situated in the compressed air chamber, and wherein the generator is mounted at an end of the module bearer situated in the region of the through-opening, and the sensor module is mounted at an end of the module bearer protruding into the compressed air chamber, the sensor module and the generator being connected to one another by at least one electrical line that runs inside the module bearer.

16. The vehicle of claim 15, wherein the module bearer (38) contains a hollow screw held in the through-opening (36) of the rim base (34) of the wheel rim (4) by a threaded connection.

17. The vehicle of claim 15, wherein the sensor module, the module bearer, and the generator form a constructive unit mounted releasably in the through-opening in the rim base of the wheel rim.

\* \* \* \* \*

UNITED STATES PATENT AND TRADEMARK OFFICE
CERTIFICATE OF CORRECTION

PATENT NO.        : 8,707,776 B2                                            Page 1 of 1
APPLICATION NO.   : 12/998353
DATED             : April 29, 2014
INVENTOR(S)       : Uwe Fischer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 324 days.

Signed and Sealed this

Twenty-ninth Day of September, 2015

Michelle K. Lee
*Director of the United States Patent and Trademark Office*